US012137161B2

(12) United States Patent
Saidi et al.

(10) Patent No.: US 12,137,161 B2
(45) Date of Patent: Nov. 5, 2024

(54) LIMITING USE OF ENCRYPTION KEYS IN AN INTEGRATED CIRCUIT DEVICE

(71) Applicant: Amazon Technologies, Inc., Seattle, WA (US)

(72) Inventors: Ali Ghassan Saidi, Austin, TX (US); Adi Habusha, Alonei Abba (IL)

(73) Assignee: Amazon Technologies, Inc., Seattle, WA (US)

( * ) Notice: Subject to any disclaimer, the term of this patent is extended or adjusted under 35 U.S.C. 154(b) by 384 days.

(21) Appl. No.: 17/548,146

(22) Filed: Dec. 10, 2021

(65) Prior Publication Data

US 2023/0188338 A1 Jun. 15, 2023

(51) Int. Cl.
*H04L 9/08* (2006.01)
*G06F 9/455* (2018.01)
*G06F 21/72* (2013.01)

(52) U.S. Cl.
CPC ........ *H04L 9/0891* (2013.01); *G06F 9/45558* (2013.01); *G06F 21/72* (2013.01); *G06F 2009/45579* (2013.01); *G06F 2009/45587* (2013.01)

(58) Field of Classification Search
CPC ..... H04L 9/0891; G06F 21/72; G06F 9/45558
See application file for complete search history.

(56) References Cited

U.S. PATENT DOCUMENTS

| | | | |
|---|---|---|---|
| 9,268,594 B2 * | 2/2016 | Shanbhogue | ....... G06F 9/45558 |
| 9,792,448 B2 * | 10/2017 | Kaplan | ............... G06F 9/45558 |
| 10,379,764 B2 * | 8/2019 | Tsirkin | ................ G06F 12/1408 |
| 10,404,674 B1 | 9/2019 | Bshara et al. | |
| 10,686,605 B2 * | 6/2020 | Chhabra | ............. G06F 21/6209 |
| 10,871,983 B2 * | 12/2020 | Feghali | ............... G06F 12/1408 |
| 11,139,967 B2 * | 10/2021 | Ouziel | ............... G06F 9/45558 |
| 11,716,617 B2 * | 8/2023 | Wentz | ................ H04L 63/0807 713/168 |
| 11,783,062 B2 * | 10/2023 | Lounsberry | ......... G06F 21/6218 726/30 |
| 11,829,517 B2 * | 11/2023 | Khosravi | ............. G06F 21/602 |
| 2015/0143134 A1 | 5/2015 | Hashimoto | |
| 2015/0261693 A1 | 9/2015 | Craddock et al. | |
| 2019/0268318 A1 * | 8/2019 | Tsirkin | .................... G06F 21/44 |
| 2020/0296128 A1 * | 9/2020 | Wentz | ................. H04L 63/1433 |
| 2020/0351089 A1 * | 11/2020 | Wentz | ................... H04L 9/3236 |
| 2020/0351657 A1 * | 11/2020 | Wentz | ................... H04L 9/3231 |

(Continued)

FOREIGN PATENT DOCUMENTS

CN 111159097 A 5/2020

*Primary Examiner* — Viral S Lakhia
(74) *Attorney, Agent, or Firm* — Kilpatrick Townsend & Stockton LLP

(57) ABSTRACT

A host device may include an interconnect, a host memory, and a set of processor cores. A processor core may execute a VM assigned to a cryptographic key and may send a request to access a physical address in the host memory toward the interconnect. An enforcer device may receive the request and extract a key identifier from the request. The enforcer device may determine whether to allow the request to access the physical address via the interconnect based on the key identifier and a list of allowed keys stored on the enforcer device. If the enforcer device determines to not allow the request to access, the enforcer device may modify the physical address and/or the key identifier of the request.

18 Claims, 9 Drawing Sheets

(56) References Cited

U.S. PATENT DOCUMENTS

| | | | |
|---|---|---|---|
| 2020/0396091 A1* | 12/2020 | Booher | G09C 1/00 |
| 2021/0181988 A1* | 6/2021 | Kim | G06F 3/0604 |
| 2021/0191882 A1* | 6/2021 | Lee | G06F 21/79 |
| 2021/0294628 A1* | 9/2021 | Tsirkin | G06F 9/45558 |
| 2021/0318966 A1* | 10/2021 | Chhabra | G06F 13/1668 |
| 2022/0327052 A1* | 10/2022 | Vijayrao | G06F 12/1475 |
| 2022/0350752 A1* | 11/2022 | Nasser | G06F 21/602 |
| 2023/0008003 A1* | 1/2023 | Damiano | H04L 9/0891 |
| 2023/0342501 A1* | 10/2023 | Stratan | G06F 21/79 |

* cited by examiner

LIMITING USE OF ENCRYPTION KEYS IN AN INTEGRATED CIRCUIT DEVICE

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, data centers housing significant numbers of interconnected computing systems have become commonplace, such as private data centers that are operated by and on behalf of a single organization, and public data centers that are operated by entities as businesses to provide computing resources to customers. Some public data center operators provide network access, power, and secure installation facilities for hardware owned by various customers, while other public data center operators provide "full service" facilities that also include hardware resources made available for use by their customers.

The advent of virtualization technologies for commodity hardware has provided benefits with respect to managing large-scale computing resources for many customers with diverse needs, allowing various computing resources to be efficiently and securely shared by multiple customers. For example, virtualization technologies may allow a single physical virtualization host to be shared among multiple users by providing each user with one or more "guest" virtual machines hosted by the single virtualization host. Each such virtual machine may represent a software simulation acting as a distinct logical computing system that provides users with the illusion that they are the sole operators of a given hardware computing resource, while also providing application isolation and security among the various virtual machines. Instantiating several different virtual machines on the same host may also help increase the overall hardware utilization levels at a data center, leading to higher returns on investment.

In many cases, virtualized resources may be used for applications that access or manipulate sensitive information. For example, financial applications, medical applications and the like may all deal with data sets that are intended to be kept confidential. Security-related artifacts such as cryptographic keys, digital certificates and the like may be utilized to ensure confidentiality and privacy of some applications.

BRIEF DESCRIPTION OF THE DRAWINGS

Various embodiments in accordance with the present disclosure will be described with reference to the drawings, in which.

DETAILED DESCRIPTION

Figure 1:
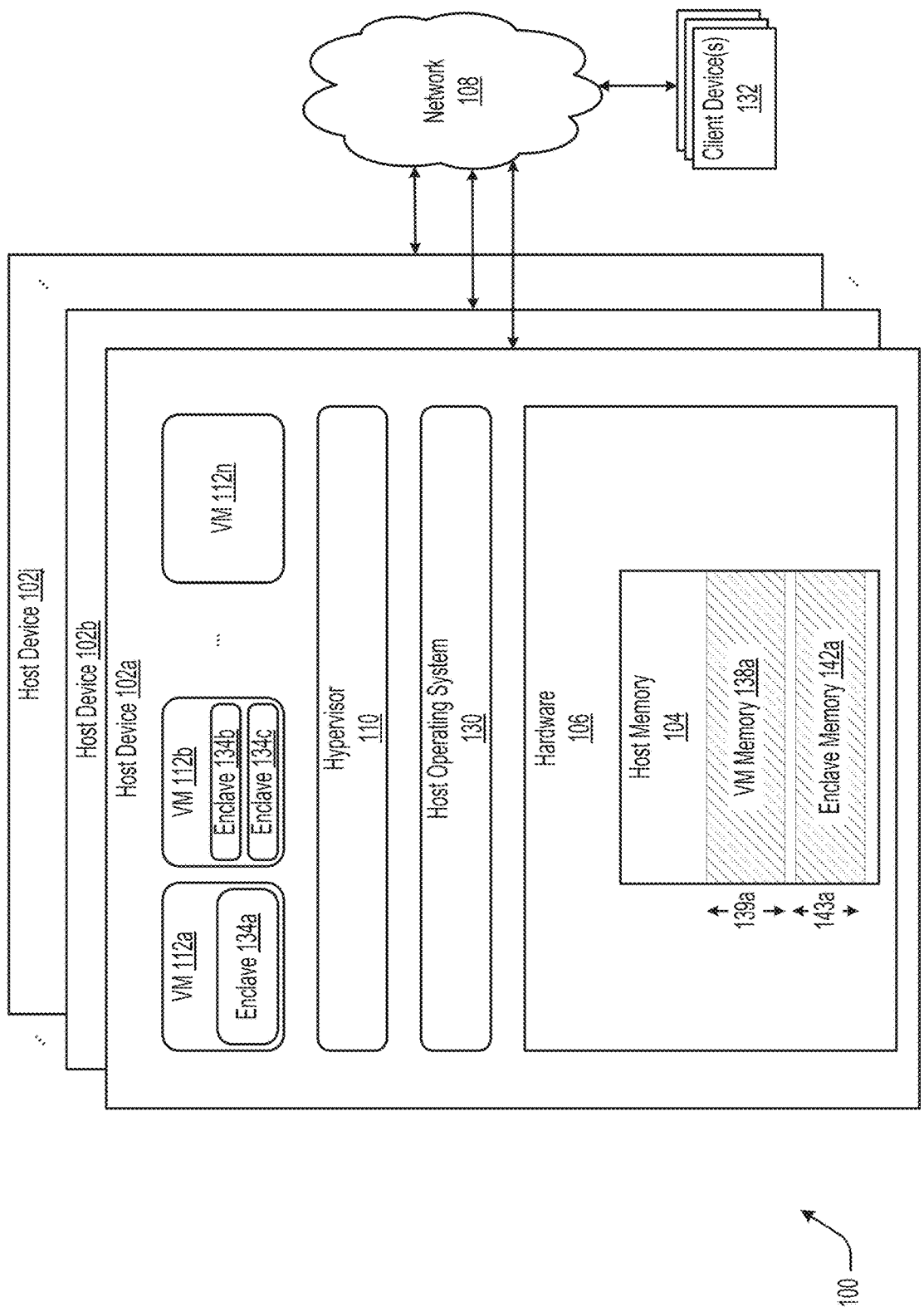
FIG. 1 illustrates a block diagram of a system including multiple host devices interconnected by a network.

In cloud computing, multiple tenants or customers can run their respective applications in a virtualized environment on the same hardware. For example, each application can be in the form of a virtual machine (VM) executing from a single host device. Generally, a hypervisor or a virtual machine manager (VMM) may be used to manage the VMs on the host device and execute at a higher privilege level than the VMs. Each VM may be allocated a portion of memory in a host memory before a VM starts executing on the host device. In some instances, data to be stored in the memory for each VM executing on a host device can be encrypted using a cryptographic key specific to a respective VM. For example, in some embodiments, the data associated with each VM can be encrypted by a memory controller communicatively coupled to the memory. Encrypting the data using specific cryptographic keys helps protect customer data that is stored on the host device, as the data becomes meaningless for other VMs that do not have access to the particular cryptographic key with which the data was encrypted.

Embodiments of the present disclosure relate to an additional layer of security in the event that an unauthorized entity gets access to the host device and attempts to use processor cores or input/output (I/O) devices to make transaction requests to access data in the host memory. Some embodiments of the present disclosure may include a set of enforcer devices coupled between the interconnect and the processor cores, the I/O devices, and any other device that may send transaction requests to the interconnect (such a device may be referred to herein as a "requester device"). Each enforcer device may be configured to receive transaction requests from its respective requester device and determine whether the transaction requests are allowed to proceed to their destination physical address in the host memory via the interconnect.

In some instances, each enforcer device verifies that each outgoing transaction request indicates the proper cryptographic key(s), e.g., the cryptographic key that is assigned to the VM being executed by the requester device. To accomplish this, an enforcer device may extract a set of key bits corresponding to a key identifier from the transaction request. The set of key bits may be encoded into the full address of the request, e.g., using unused upper bits in the full address. The enforcer device may then compare the key bits to one or more cryptographic keys (e.g., key identifiers) in a list of allowed keys (e.g., a list of allowed key identifiers) that is stored in the enforcer device. If a matching key is found, the enforcer device allows the transaction request to pass through the enforcer device.

If the enforcer device does not find a matching key, the enforcer device may perform any of several different actions to prevent the transaction request from accessing the physical address via the interconnect. In one example, the enforcer device may modify the physical address (and/or the key identifier) in the transaction request to form a modified physical address. The transaction request having the modified physical address (and/or the modified key identifier) may be passed onto the interconnect where, in some examples, it may be redirected within the host device away from the original physical address. In another example, the modified physical address may be forced to 0s or to some other predetermined values that cause the transaction request to result in an error. In another example, the transaction request may be unable to decrypt the data stored in the host memory due to the modified key identifier.

Functionally, the enforcer devices improve security within the host device by ensuring that any access to VM memory within the host memory is coming from the processor cores or other requester devices that are associated with that VM and have the proper permission. The enforcer devices may further allow the host device to become aware of processor cores or other requester devices that have become compromised. For example, when an enforcer device sends a transaction request to the interconnect with a modified physical address, the access to the modified physical address may trigger a notification to the host device to let the host device know that an improper request was made and which requester device made the improper request.

Some embodiments may employ the use of firmware stored on the host device to program each enforcer device. For example, the firmware may update each enforcer device's list of allowed keys to include particular cryptographic keys. In some instances, the firmware may perform a series of steps to update the lists of allowed keys for the enforcer devices when a processor core (or other requester device) begins running a VM with an assigned cryptographic key. First, the firmware may flush the caches of each processor core that was previously associated with the cryptographic key (e.g., each processor core that was previously running the VM). Second, the firmware may change the contents of the cryptographic key in the memory controller, effectively creating a new cryptographic key. Last, the firmware may update the list of allowed keys for each enforcer device that will begin running the VM to include the new cryptographic key (e.g., by updating each list of allowed keys to include an identifier for the new cryptographic key).

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiments being described.

Some of the figures herein follow a numbering convention in which the first digit or digits correspond to the figure number and the remaining digits identify an element or component in the figure. Similar elements or components between different figures may be identified by the use of similar digits. For example, 102 may reference element "02" in FIG. 1, and a similar element may be referenced as 202 in FIG. 2. As will be appreciated, elements shown in the various embodiments herein can be added, exchanged, and eliminated so as to provide a number of additional embodiments of the present disclosure.

FIG. 1 illustrates a block diagram of a system 100 including multiple host devices 102a-102j interconnected by a network 108, in accordance with some embodiments. Each of host devices 102 may correspond to a computer, e.g., a server computer, and may have a number of hardware 106 and software elements. In some instances, system 100 may be configured to provide computing resources to be controlled by one or more client devices 132. For example, host devices 102 may provide data storage and computing power services to client devices 132. In some embodiments, two or more of host devices 102 may be co-located (e.g., as part of a local network) or may be distributed over multiple geographic locations (e.g., at various data centers).

In some embodiments, to allow client devices 132 to access the computing resources of host devices 102, system 100 may implement various programmatic interfaces, including for example one or more web-based consoles, a collection of application programming interfaces (APIs), command line tools, graphical user interfaces and the like. Such interfaces may be utilized by client devices 132 to request various types of configuration operations, receive corresponding responses and the like. For example, client devices 132 may submit programmatic requests to launch or instantiate compute instances, such as VMs 112a-112n, and/or to set up isolated run-time environments (IRE), such as enclaves 134a-134c. While the present disclosure is generally directed to VMs, other types of compute instances are possible with various embodiments.

In some implementations, each of host devices 102 (such as host device 102a) may include a host operating system 130 executing on hardware 106. For example, hardware 106 may include processors, memories, controllers, or any suitable components. A hypervisor 110 may be configured to execute on host operating system 130, and to manage a plurality of VMs 112 on host device 102a, e.g., a first VM 112a, a second VM 112b, or an Nth VM 112n. For example, N may be a positive integer, e.g., 10, 200, etc.

Hypervisor 110, also called a VMM, can virtualize a single device as multiple virtual devices in a virtualized environment. Hypervisor 110 can also manage the flow of information between software, the virtualized hardware, and the physical hardware. Hypervisor 110 may be configured to create, start, monitor, stop or to delete each of VMs 112, and may execute at a higher privilege level than VMs 112. In some implementations, hypervisor 110 can manage access controls, resources, scheduling, isolation, etc., for VMs 112 executing their respective guest operating systems (not shown). Hypervisor 110 may be implemented as a software layer or as code embedded in firmware on host device 102a. Even though hypervisor 110 is shown in FIG. 1 as the type 2 hypervisor (e.g., hosted hypervisor), it will be understood that hypervisor 110 may also be implemented as a type 1 hypervisor (e.g., bare metal hypervisor), or any other suitable implementation.

Each of VMs 112 may be any suitable emulation of a computer system that may be managed by hypervisor 110. Each of VMs 112 can run an independent operating system and an application on hardware 106. For example, in some instances, VMs 112 may perform a write transaction to store data in a host memory 104, or a read transaction to read data stored in host memory 104, which may include dynamic random access memory (DRAM), synchronous DRAM (SDRAM), storage class memory (SCM), or any other suitable memory. Two or more VMs from VMs 112 may execute simultaneously or in any order on host device 102a. For example, in some instances, VM 112b may be initiated before VM 112a.

Generally, before one of VMs 112 starts executing, hypervisor 110 may allocate a certain portion of host memory 104, e.g., VM memory, to that VM. As an example, hypervisor 110 may allocate VM memory 138a to VM 112a when VM 112a is created or before VM 112a starts executing. VM memory 138a may correspond to a physical address space 139a from an address space assigned to host memory 104. When VM 112a is terminated, migrated, or has been inactive for an extended period of time, VM memory 138a used by VM 112a may be assigned to another VM, e.g., VM 112b. In one instance, when VM 112b is created, or right after VM 112b is initiated, or before VM 112b starts executing, hypervisor 110 may allocate VM memory 138a to VM 112b. Since VM memory 138a was previously used by VM 112a, VM memory 138a may still store the data associated with VM 112a and therefore hypervisor 110 may cause VM memory 138a to be sanitized before it can be used by VM 112b.

In some instances, after a request to initiate a compute instance, such as one of VMs 112, has been made by one of client devices 132, a set of resources may be allocated to the compute instance, such as a portion of host memory 104. Furthermore, in some embodiments, the client request may also indicate that one or more IREs, such as enclaves 134, are to be set up at the compute instance and/or are to use computing resources reserved for the compute instance. Similar to that described above, hypervisor 110 may allocate enclave memory 142a to enclave 134a when enclave 134a is created or before enclave 134a starts executing. Enclave memory 142a may correspond to a physical address space 143a from an address space assigned to host memory 104. In some embodiments, at least a portion of the memory allocated to VM 112a may be segregated or set aside for enclave 134a by hypervisor 110.

The VM whose resources are used for the enclave may be referred to as the "parent" VM of the enclave, and the enclave may be referred to as a child or dependent run-time environment, logically tightly linked to the parent VM. Thus, for example, enclave 134a may be set up with VM 112a as its parent, and VM 112b may be configured as the parent VM of enclaves 134b and 134c. Note that not all VMs at host device 102a may necessarily have child enclaves in the depicted embodiment: for example, VM 112n running at host device 102a may not include an enclave.

In at least some embodiments, the lifetimes of individual enclaves and their parent VMs (or their peer enclaves at the same VM) may differ—e.g., it may be the case that enclave 134a is terminated before VM 112a, or that enclave 134b is terminated before VM 112b in the example scenario shown in FIG. 1. The resources of the parent VM that are segregated or set aside for an enclave may not be accessible to programs or processes running at the parent VM in at least some embodiments—for example, if 4 gigabytes of a total of 32 gigabytes of memory that was originally allocated to VM 112a is set aside for enclave 134a, programs/processes within VM 112a may only be able to access and use the remaining 28 gigabytes while enclave 134a remains in existence.

When configuring or instantiating enclaves 134, in various embodiments a number of constraints may be enforced to limit the manner in which programs or processes within the enclave can communicate or interact with other entities (e.g., processes/programs running in the parent VM, or outside the parent VM). In at least one embodiment, for example, an enclave process/program may be prohibited from over-the-wire networking communications with any entities outside the enclave (e.g., by not configuring virtual or physical network interfaces accessible to the enclave). Similarly, in various embodiments, enclaves 134 may be configured such that access to persistent storage devices and/or file systems is prohibited—that is, processes/programs within an enclave may not be able to perform reads or writes to persistent storage.

Figure 2:
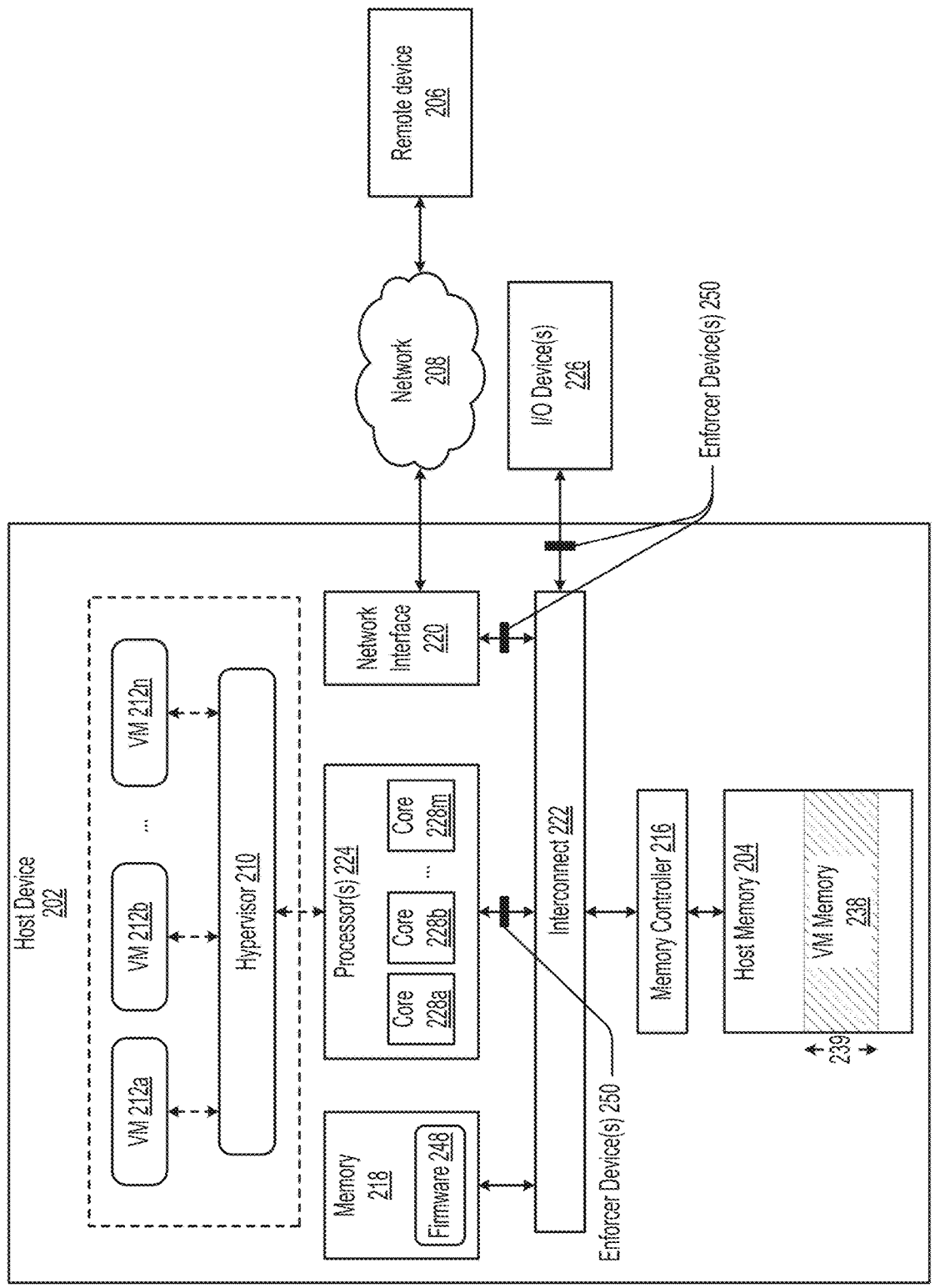
FIG. 2 illustrates a block diagram of a host device.

FIG. 2 illustrates a block diagram of a host device 202, in accordance with some embodiments. In the illustrated example, host device 202 is communicatively coupled to a remote device 206 via a network 208 and to one or more I/O devices 226. Host device 202 may include a computer, e.g., a server computer.

In some implementations, host device 202 may include one or more processors 224 which may be communicatively coupled to a memory 218, a network interface 220, I/O devices 226, among other components. In some embodiments, processors 224 may include a set of processor cores 228a-228m, each of which may be capable of independently reading and executing program instructions stored in a memory 218 and/or a host memory. For example, processors 224 may include a multi-core processor containing processor cores 228. Host device 202 may include an interconnect 222 that connects the different components of host device 202. Interconnect may employ one or more buses, fabrics, etc., and/or may employ one or more interconnect architectures, such as a mesh interconnect architecture. In the illustrated example, each of memory 218, processors 224, processor cores 228 (via enforcer devices 250), network interface 220 (via enforcer devices 250), I/O devices 226 (via enforcer devices 250), and host memory 204 (via memory controller 216) may be communicatively coupled to interconnect 222.

A hypervisor 210 may be configured to execute on processor(s) 224 (e.g., on processor cores 228) in a virtualized environment. As discussed previously with reference to FIG. 1, hypervisor 210 may be hosted on an operating system (not shown) running on processors 224 or may execute directly on processor(s) 224. Hypervisor 210 may be configured to manage a plurality of VMs 212, such as a first VM 212a, a second VM 212b, . . . , and an Nth VM 212n. VMs 212 may be similar to VMs 112 as discussed with reference to FIG. 1. Hypervisor 210 can also manage the flow of information between software, the virtualized hardware, and the physical hardware (e.g., processors 224, memory controller 216, memory 218, network interface 220, I/O devices 226, and any other physical hardware). Hypervisor 210 may be configured to create, start, monitor, stop or to delete each of VMs 212 as well as one or more enclaves, as discussed with reference to FIG. 1. In some implementations, hypervisor 210 can manage access controls, resources, scheduling, isolation, etc., for VMs 212 executing their respective guest operating systems (not shown).

In some embodiments, hypervisor 210 can allocate memory to a VM when the VM is created or before the VM starts executing. In some embodiments, hypervisor 210 may instruct memory controller 216 to generate a cryptographic key specific to the VM when the VM is created and can, in some embodiments, provide a virtual machine identifier (VMID) associated with the VM to memory controller 216. For example, in some implementations, hypervisor 210 may write to a register in memory controller 216 to initiate the generation of the cryptographic key. In some embodiments, a VMID may be assigned to a VM when the VM is created and can be reused after that VM is terminated. Hypervisor 210 may assign the VMIDs arbitrarily as the VMs are created such that each active VM has a unique VMID. Memory controller 216 may generate the cryptographic key specific to the VM and can use the VMID as an index to store the cryptographic key in a table. Hypervisor 210 can also provide the VMID in a transaction request to write data to host memory 204 or to read data from host memory 204.

In some embodiments, hypervisor 210 can allocate one or more of processors 224 (including processor cores 228) to a VM when the VM is created or before the VM starts executing. Each allocated processor or processor core may execute the VM (e.g., instructions associated with the VM)

and may further be associated with any cryptographic keys assigned to the VM. In one example, hypervisor 210 may allocate processor core 228a to VM 212a, assign a first cryptographic key to VM 212a, and associate processor core 228a with the first cryptographic key. In another example, hypervisor 210 may allocate processor cores 228a and 228b to VM 212a, assign a first cryptographic key to VM 212a, and associate each of processor cores 228a and 228b with the first cryptographic key. In another example, hypervisor 210 may allocate processor core 228a to VMs 212a and 212b, assign a first cryptographic key to VM 212a and a second cryptographic key to VM 212b, and associate processor core 228a with each of the first cryptographic key and the second cryptographic key.

Host memory 204 may be similar to host memory 104 as discussed with reference to FIG. 1. For example, host memory 204 may include DRAM, SDRAM, SCM, or any other suitable memory. In some implementations, VM memory 238 may include a portion of host memory 204 that may be allocated to one or more VMs from VMs 212. For example, hypervisor 210 can allocate VM memory 238 to a VM corresponding to a physical address space 239 in host memory 204. For example, VM memory 238 may be allocated to the VM by hypervisor 210 when the VM is created or before the VM starts executing. VM memory 238 may be accessed using an address from physical address space 239.

Memory controller 216 may provide an interface between interconnect 222 (and likewise processor(s) 224 and I/O devices 226) and host memory 204 for transactions with host memory 204. For example, memory controller 216 may be configured to provide data, an address for the data, and controls to host memory 204 for a write transaction. Similarly, memory controller 216 may be configured to provide address and controls to host memory 204 for a read transaction. In some implementations, memory controller 216 may also be configured to receive data read from host memory 204 for the read transaction. In some implementations, memory controller 216 and/or host memory 204 may be separate from host device 202. In some embodiments, memory controller 216 may be integrated with host memory 204. While a single memory controller 216 is shown in FIG. 2, it is to be understood that multiple memory controllers may be employed between interconnect 222 and host memory 204.

In some embodiments, memory controller 216 may receive a key identifier (e.g., a VMID) for a VM with an instruction from hypervisor 210 to generate a cryptographic key for the VM. Memory controller 216 may be configured to generate and store cryptographic keys associated with different VMs in a table. Memory controller 216 may use the key identifier (or the VMID) for each VM as an index to the table to store a cryptographic key for the respective VM. In some embodiments, the cryptographic keys may be locally stored on memory controller 216 and may not be accessible to processors 224. According to some embodiments, the cryptographic key for each of the respective VMs is unique to the VM so that the encrypted data for one VM may not be decipherable by another VM. In one embodiment, a cryptographic key associated with a VM may be generated by memory controller 216 using a random number generator. In another embodiment, the cryptographic key may be received from remote device 206 over network 208 or may be derived using a combination of a randomly generated key and a remote key received from remote device 206.

In some embodiments, host device 202 may include a set of enforcer devices 250 coupled between each of processors 224 (including processor cores 228) and interconnect 222, between each of I/O devices 226 and interconnect 222, and between network interface 220 and interconnect 222. Each of enforcer devices 250 may be configured to receive transaction requests from its respective requester device (e.g., a processor core or an I/O device) and determine whether the transaction requests are allowed to proceed to their destination (e.g., in host memory 204) via interconnect 222. In some instances, enforcer devices 250 verify that each outgoing transaction request indicates the proper cryptographic key, e.g., the cryptographic key with which the requester device is associated. Functionally, enforcer devices 250 improve security within host device 202 by ensuring that any access to VM memory is only coming from the processor cores or other requester devices that are associated with that VM.

In some implementations, firmware 248 stored on host device 202 (e.g., in memory 218) may program each of enforcer devices 250 to include a list of one or more allowed cryptographic key(s) that may be used to evaluate the outgoing transaction requests. When a particular one of enforcer devices 250 is programed by firmware 248 to include a particular cryptographic key in its list of allowed keys, any outgoing transaction request from a requester device that includes the particular cryptographic key (e.g., an identifier for the particular cryptographic key) is allowed to pass through to host memory 204 via interconnect 222 unimpeded and/or unaffected. Otherwise, when an outgoing transaction request from a requester device that does not include the particular cryptographic key (or any other cryptographic key in the enforcer device's allowed list of keys), the transaction request is impeded, rerouted, deleted, or otherwise prevented from reaching the destination physical address in host memory 204 with the particular key identifier.

In some implementations, each of enforcer devices 250 may be configured to analyze the full address of the transaction request to extract a set of key bits and a physical address from the transaction request. In some embodiments, the set of key bits may be encoded into the full address, e.g., using unused upper bits in the full address. Each of enforcer devices 250 may compare the key bits to each cryptographic key in the respective enforcer device's list of allowed keys. This may be accomplished using a set of digital logic gates such as AND gates that take a bit from the key bits as one input and a bit from a cryptographic key in the list of allowed keys as the other input. If a matching key is found, the enforcer device allows the transaction request to pass through the enforcer device without modifying the transaction request and/or the physical address included therein.

In some embodiments, if no matching key is found, the enforcer device may perform any of several different actions to prevent the transaction request from accessing the physical address via interconnect 222. In one example, the enforcer device may modify the physical address in the transaction request to form a modified physical address. The transaction request having the modified physical address may be passed onto interconnect 222 where it may be redirected within host device 202 away from the original physical address. In some embodiments, the modified physical address may be 0s, i.e., the enforcer device may force the physical address to 0s. In some embodiments, sending the transaction request to interconnect 222 with the modified physical address may cause host device 202 to become notified that an improper request was made on host device 202, and may further alert host device 202 as to which requester device made the improper request, allowing host device 202 to disable the requester device and/or the VM(s) running on the requester device.

In one example, one of VMs 212 may start executing and may initiate a transaction request to write data to host memory 204. The transaction request may include data to be written (e.g., write data), the physical address for the data to be written (e.g., a write address), and an identifier for the cryptographic key assigned to the VM (e.g., which may be encoded into the physical address). The identifier for the cryptographic key may include the VMID for the VM initiating the transaction request. The write address may correspond to physical address space 239 associated with VM memory 238 allocated to the VM by hypervisor 210. Upon receiving the transaction request from one of processor cores 228, one of enforcer devices 250 coupled to that processor core may extract the identifier for the cryptographic key from the transaction request and compare the extracted key bits to a list of allowed keys stored on the enforcer device. The enforcer device may then find a matching key identifier and allow the transaction request to pass through to interconnect 222 and thereafter to memory controller 216, which may use the key identifier (e.g., the VMID) to retrieve the cryptographic key associated with the VM stored in the table to encrypt the data to be written. For example, memory controller 216 may use the VMID for the VM as an index to retrieve the cryptographic key for encryption.

In a similar example, one of VMs 212 may initiate a transaction request to read data from host memory 204. The transaction request may include the physical address to read the data from (e.g., a read address), and an identifier for the cryptographic key assigned to the VM, which may include the VMID for the VM initiating the transaction request. The read address may correspond to physical address space 239 associated with VM memory 238 allocated to the VM. Upon receiving the transaction request from one of processor cores 228, one of enforcer devices 250 coupled to that processor core may extract the identifier for the cryptographic key (which may include the VMID) from the transaction request and compare the extracted key bits to a list of allowed keys stored on the enforcer device. The enforcer device may then find a matching key and allow the transaction request to pass through to interconnect 222 and thereafter to memory controller 216, which may use the key identifier (e.g., the VMID) to retrieve the cryptographic key associated with the VM stored in the table to decrypt the data read from host memory 204. For example, memory controller 216 may use the VMID for the VM as an index to retrieve the cryptographic key for decryption.

In some embodiments, use of enforcer devices 250 is combined with a set of restrictions within host device 202 to further improve the security benefits provided by enforcer devices 250. For example, in some embodiments, hypervisor 210 may be prevented from updating the list of allowed keys for enforcer device 250. Instead, only firmware 248 may be allowed to program enforcer devices 250, and may do so at VM start. If, for example, hypervisor 210 requests for a particular cryptographic key to be enabled in some of processor cores 228, this can only be done using firmware 248 at VM start.

In some embodiments, firmware 248 may perform a series of steps to update the lists of allowed keys for enforcer devices 250 when one of processor cores 228 begins running a new VM 212 with an assigned cryptographic key. First, firmware 248 causes the caches (e.g., L1/L2 caches) of each of processor cores 228 that were previously associated with the cryptographic key to be flushed. Second, firmware 248 changes the contents of the cryptographic key in memory controller 216 (thereby, in some embodiments, effectively creating a new cryptographic key). Last, firmware 248 updates the list of allowed keys for each of enforcer devices 250 that will begin running the VM to include the new cryptographic key.

Memory 218, which may store firmware 248, may include volatile or non-volatile memory. In some embodiments, memory 218 may include a non-transitory computer readable medium. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may be executed by processors 224. For example, the instructions stored in memory 218 may include instructions associated with hypervisor 210. In some embodiments, memory 218 may also include one or more configuration registers. In some implementations, memory 218 may be used to store a remote key provided by remote device 206 over network 208.

Network interface 220 may include any suitable interface to enable host device 202 to communicate with remote device 206 via network 208. In some embodiments, network 208 may include one or more networks that may be based on different protocols such as the Internet Protocol (IP), Ethernet, Wi-Fi, Transmission Control Protocol (TCP), User Datagram Protocol (UDP), Asynchronous Transfer Mode (ATM), token ring, frame relay, High Level Data Link Control (HDLC), Fiber Distributed Data Interface (FDDI), Point-to-Point Protocol (PPP), etc. As an example, in one implementation, network interface 220 may include a physical Ethernet port. In some embodiments, remote device 206 may be a client device, such as one of client devices 132 described with reference to FIG. 1.

Figure 3:
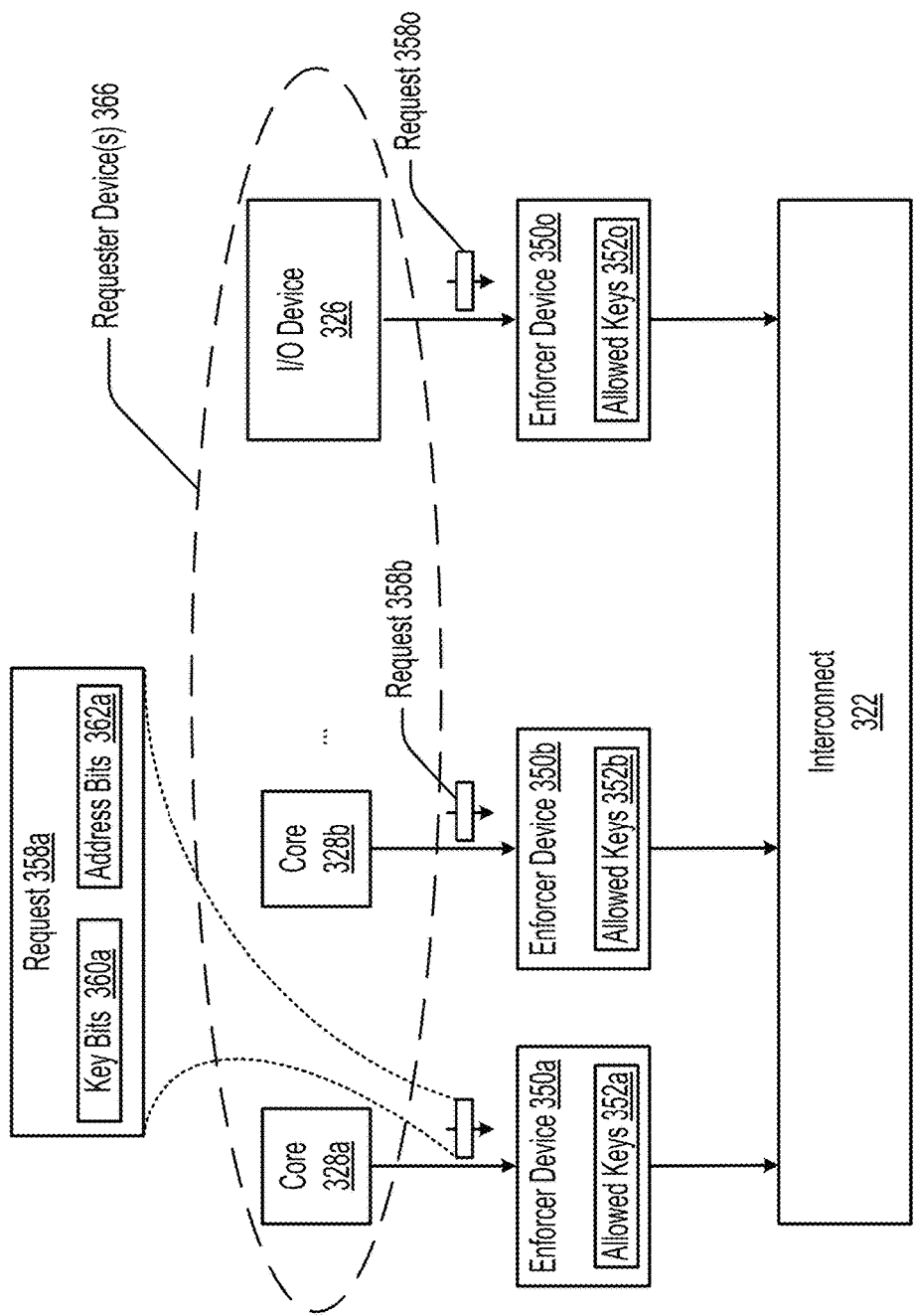
FIG. 3 illustrates a block diagram of a set of requester devices, a set of enforcer devices, and an interconnect.

FIG. 3 illustrates a block diagram of a set of requester devices 366, a set of enforcer devices 350a-350o, and an interconnect 322, in accordance with some embodiments. Each of the illustrated elements may be elements of a host device, as described herein. In the illustrated example, requester devices 366 include an I/O device 326 and a set of processor cores 328 including a first processor core 328a and a second processor core 328b. Each of requester devices 366 may be communicatively coupled to a corresponding one of enforcer devices 350 such that, in the illustrated example, there is a one-to-one correspondence between requester devices 366 and enforcer devices 350.

In some embodiments, each of enforcer devices 350 may be configured to receive all outgoing transaction requests 358 from requester devices 366. For example, during execution of a VM, processor core 328a may send request 358a toward interconnect 322. Prior to reaching interconnect 322, request 358a may be received by enforcer device 350a, which may extract a set of key bits 360a from request 358a. Key bits 360a may correspond to an identifier for a cryptographic key associated with the VM being executed by processor core 328a that initiated request 358a. Optionally, enforcer device 350a may also extract a set of address bits 362a from request 358a that correspond to the physical address in the host memory that request 358a is attempting to access. Enforcer 350a may then compare key bits 360a to a set of allowed keys 352a to determine whether request 358a is allowed to access the physical address in the host memory.

Independently and/or concurrently to that described in reference to processor core 328a and enforcer device 350a, during execution of a VM (which may be the same VM or a different VM than that being executed by processor core 328a), processor core 328b may send request 358b toward interconnect 322. Prior to reaching interconnect 322, request 358b may be received by enforcer device 350b, which extracts key bits (not shown) from request 358b and compares the key bits to a set of allowed keys 352b to determine whether request 358b is allowed to access the physical address indicated by request 358b in the host memory.

Independently and/or concurrently to that described in reference to processor cores 328a and 328b and enforcer devices 350a and 350b, I/O device 326 may send request 358o toward interconnect 322. Prior to reaching interconnect 322, request 358o may be received by enforcer device 350o, which extracts key bits (not shown) from request 358o and compares the key bits to a set of allowed keys 352o to determine whether request 358o is allowed to access the physical address indicated by request 358o in the host memory. In some embodiments, I/O device 326 may be utilized in conjunction with a cryptographic key and accordingly may have its corresponding enforcer device 350o be programmed by firmware to include the cryptographic key in its set of allowed keys 352o.

Figure 4:
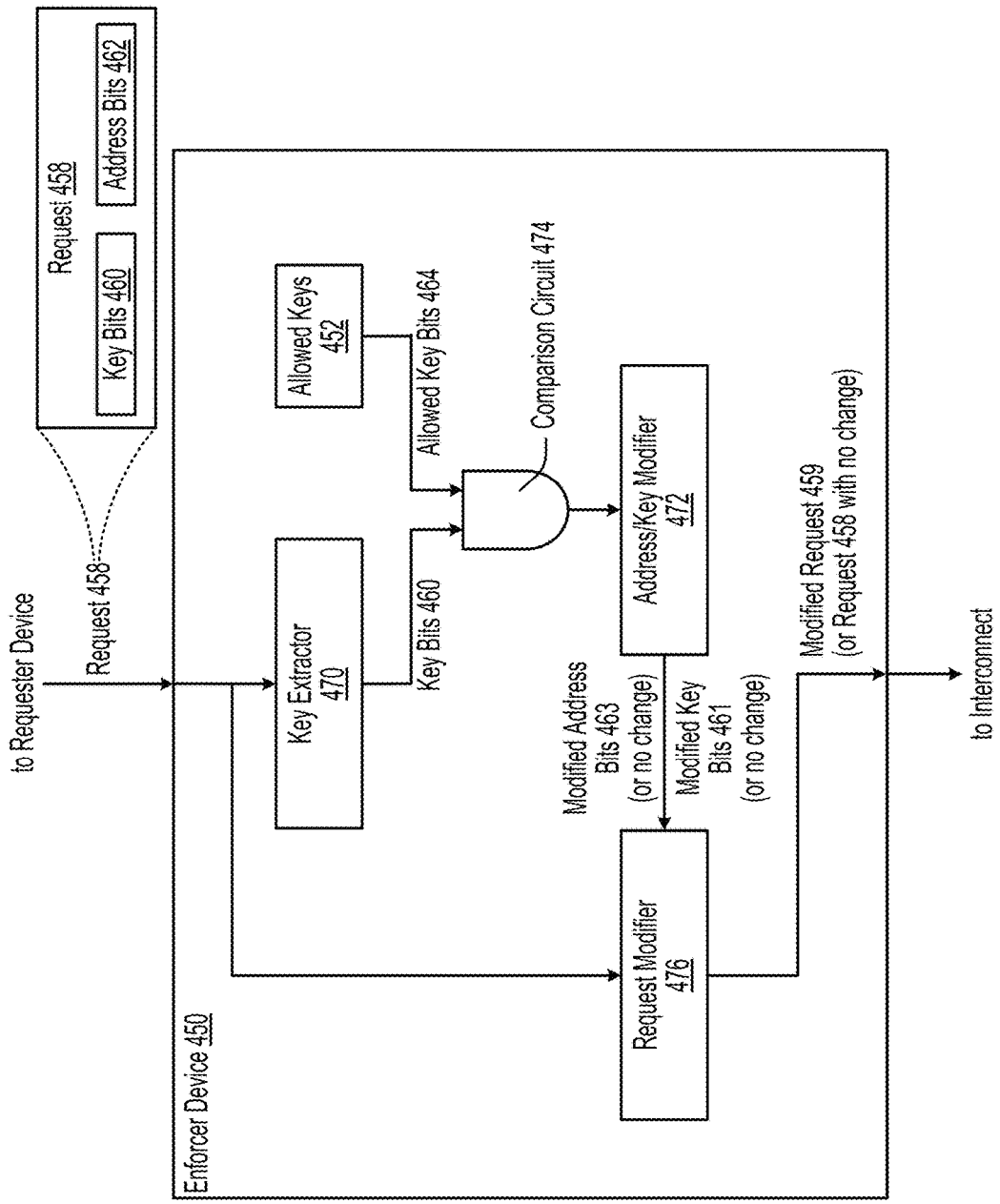
FIG. 4 illustrates a block diagram of an enforcer device.

FIG. 4 illustrates a block diagram of an enforcer device 450, in accordance with some embodiments. Enforcer device 450 may include various elements including a key extractor 470, a comparison circuit 474, an address/key modifier 472, and a request modifier 476, each of which may be implemented using digital logic circuits or gates. Enforcer device 450 may store a set of allowed keys 452 using a suitable memory element, such as a set of registers. In the illustrated example, enforcer device 450 receives a request 458 that may be an outgoing transaction request from a requester device, such as a processor core. In some instances, enforcer device 450 may be configured to determine whether an incoming signal is a request or is something other than a request. In some instances, enforcer device 450 may be configured to pass through anything other than a request without modification.

Upon receiving request 458, key extractor 470 may extract a set of key bits 460 from request 458. Key bits 460 may be an identifier for a cryptographic key. Once key bits 460 are obtained, they are compared to a set of allowed key bits 464 from allowed keys 452 using comparison circuit 474. When allowed keys 452 include more than one stored cryptographic key, allowed key bits 464 for different cryptographic keys may be sequentially or simultaneously compared to key bits 460 using, for example, using additional inputs for comparison circuit 474, and/or using multiple AND gates and using an OR gate to collect the outputs of the AND gates into a single output signal. In some embodiments, key bits 460 are converted into a one-hot encoding vector that is provided to comparison circuit 474 and, for example, an AND operation is performed between the one-hot encoding vector representing key bits 460 and allowed bits 464. In some embodiments (not shown), enforcer device 450 may further include an address extractor that extracts a set of address bits 462 from request 468. For example, enforcer device 450 may extract the full address contained in request 468 and then extract address bits 462 from the address.

If the output of comparison circuit 474 indicates that none of allowed keys 452 matches key bits 460, then address/key modifier 472 may generate a set of modified address bits 463 to replace address bits 462 and/or address/key modifier 472 may generate a set of modified key bits 461 to replace key bits 460. Request modifier 476 may receive modified address bits 463 and may modify request 458 such that address bits 462 are replaced with modified address bits 463 and/or request modifier 476 may receive modified key bits 461 and may modify request 458 such that key bits 460 are replaced with modified key bits 461, thereby forming a modified request 459. Modified address bits 463 may be a known address that will cause the request to ultimately return an error. Modified key bits 461 may correspond to any key identifier (or any set of bits) that is different than the key identifier for key bits 460. Modified request 459 may then be passed to the interconnect.

Otherwise, if the output of comparison circuit 474 indicates that at least one of allowed keys 452 matches key bits 460 (or, in some embodiments, that each of allowed keys 452 matches key bits 460), then address/key modifier 472 may cause (e.g., by writing to a register) that request 458 is allowed to pass through enforcer device 450 to the interconnect unmodified. In such cases, neither modified address bits 463 nor modified key bits 461 may be generated by address/key modifier 472. Alternatively or additionally, address/key modifier 472 may cause request modifier 476 to not perform any operations on request 458.

Figure 5:
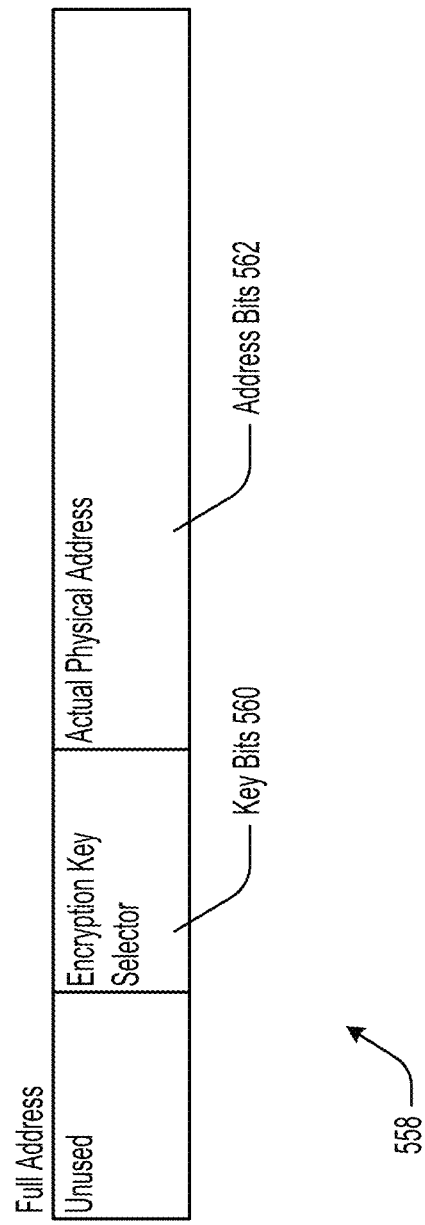
FIG. 5 illustrates an example of a request.

FIG. 5 illustrates an example of a request 558, in accordance with some embodiments. Request 558 may include a full address that includes a plurality of bits. In the illustrated example, a first portion of the bits may be an actual physical address (corresponding to address bits 562), a second portion of the bits may be an encryption key selector (corresponding to key bits 560), and a third portion of the bits may be unused. In some embodiments, key bits 560 may be positioned at higher bits than address bits 562, while in other embodiments key bits 560 may be mixed with address bits 562 within the full address in a more sophisticated manner. Other possibilities for encoding address bits 562 into the address are contemplated.

Figure 6:
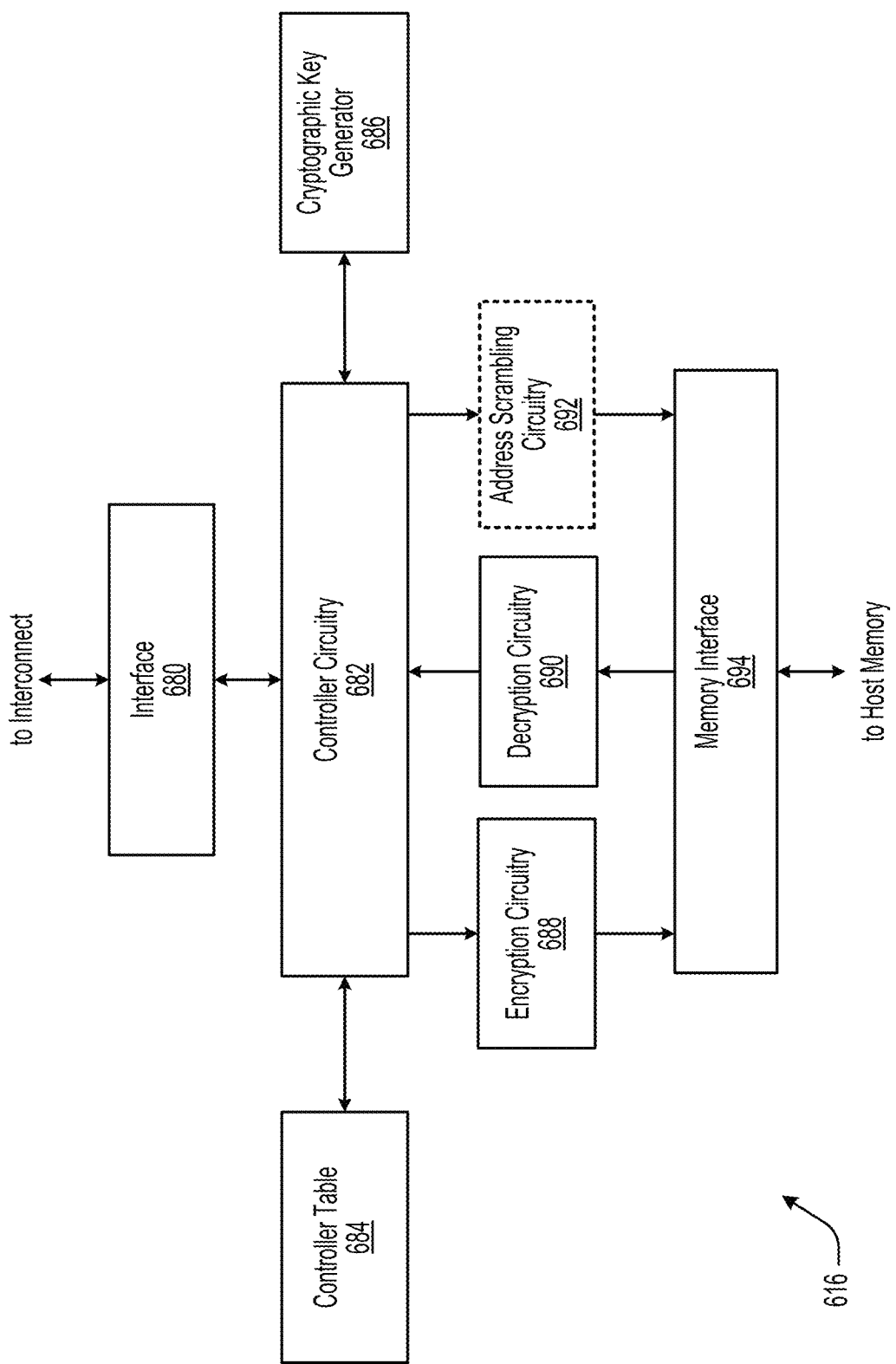
FIG. 6 illustrates a block diagram of a memory controller.

FIG. 6 illustrates a block diagram of a memory controller 616, in accordance with some embodiments. In some implementations, memory controller 616 may include an interface 680, controller circuitry 682, a controller table 684, a cryptographic key generator 686, encryption circuitry 688, address scrambling circuitry 692, decryption circuitry 690, and a memory interface 694. Memory controller 616 may include additional components, e.g., arbiter(s), buffers, etc. It will be understood that in different implementations, memory controller 616 may be implemented using various hardware components, software components, programmable logic, etc. For example, in some embodiments, memory controller 616 may be implemented as an application specific integrated circuit (ASIC), a field programmable gate array (FPGA), or any suitable circuit.

Interface 680 may provide a communication interface with the interconnect. For example, in one instance, interface 680 may receive a key identifier associated with a VM, such as a VMID, from the hypervisor for generating a cryptographic key for the VM. In some embodiments, interface 680 may be configured to receive a transaction request by a VM to access a memory communicatively coupled to memory controller 616. For example, the transaction request may be for a write transaction or a read transaction with the host memory.

Cryptographic key generator 686 may be configured to manage generation of a respective cryptographic key associated with each VM from the plurality of VMs. For example, cryptographic key generator 686 may be configured to manage generation of a first cryptographic key for a first VM and a second cryptographic key for a second VM. In some implementations, a cryptographic key may be generated for a VM after receiving a key identifier (e.g., a VMID) for the VM from the hypervisor.

In some embodiments, controller table 684 may be configured to store the cryptographic key associated with each VM using a respective VMID as an index. In some implementations, controller table 684 may be used to store a key configuration, a cryptographic key, an address scrambling flag, and an optional encryption flag, corresponding to each VMID. For example, controller circuitry may receive the VMID from the hypervisor for generating a cryptographic key for a VM. Based on the key configuration corresponding to the VMID, controller circuitry 682 may store a random key or a derived key generated by cryptographic key generator. The address scrambling flag corresponding to each VMID may be used to determine if an address for a transaction initiated by a VM associated with the VMID has to be scrambled. The encryption flag for the VMID may be used to indicate whether encryption has to be performed on data associated with a particular VMID.

Encryption circuitry 688 may be configured to encrypt the data for a write transaction with the host memory initiated by a VM using a cryptographic key associated with the VM. For example, the cryptographic key may be retrieved from controller table 684 using the VMID associated with the VM received in the transaction request. Decryption circuitry 690 may be configured to decrypt the data read from the host memory for a read transaction initiated by a VM. Decryption circuitry 690 may use the cryptographic key associated with the VMID received in the transaction request. For example, the cryptographic key may be retrieved from controller table 684 using the VMID.

If the data read from the host memory includes data that was encrypted using a cryptographic key which was different than the key used for decrypting the data, e.g., if the write and read transactions were initiated by different VMs with different VMIDs, data produced by decryption circuitry 690 may be meaningless to the VM requesting the read transaction and hence may include garbage data. Thus, a read transaction performed by a VM to an address in the host memory may return garbage data if a write to that address was not performed by the same VM previously. Accordingly, a VM cannot misuse the encrypted data written by another VM since it may not have visibility to the real content of the encrypted data.

In some implementations, address scrambling circuitry 692 may be employed in memory controller 616 to scramble or modify, using a scrambling function, an address associated with a write or a read transaction with the host memory. In some embodiments, the scrambling function may be used to scramble the address by generating a hash of the address. Address scrambling circuitry 692 can perform a one-to-one mapping in order to avoid hashing to the same address by two VMs. In some embodiments, modifying the address using the scrambling function may include a one-to-one mapping. For example, the one-to-one mapping may include mapping between the address used for addressing the memory and its corresponding modified address. The address used for addressing the memory and its corresponding modified address can be within a page of the respective VM.

Memory interface 694 may be configured to communicate with the host memory for a write or a read transaction initiated by a VM with the host memory. For example, memory interface 694 may provide the encrypted data, and an address for the encrypted data, for writing the encrypted data at a location corresponding to the address from the physical address space corresponding to the portion of the memory allocated to the VM. The encrypted data for the write transaction may be received from encryption circuitry 688.

Figure 7:
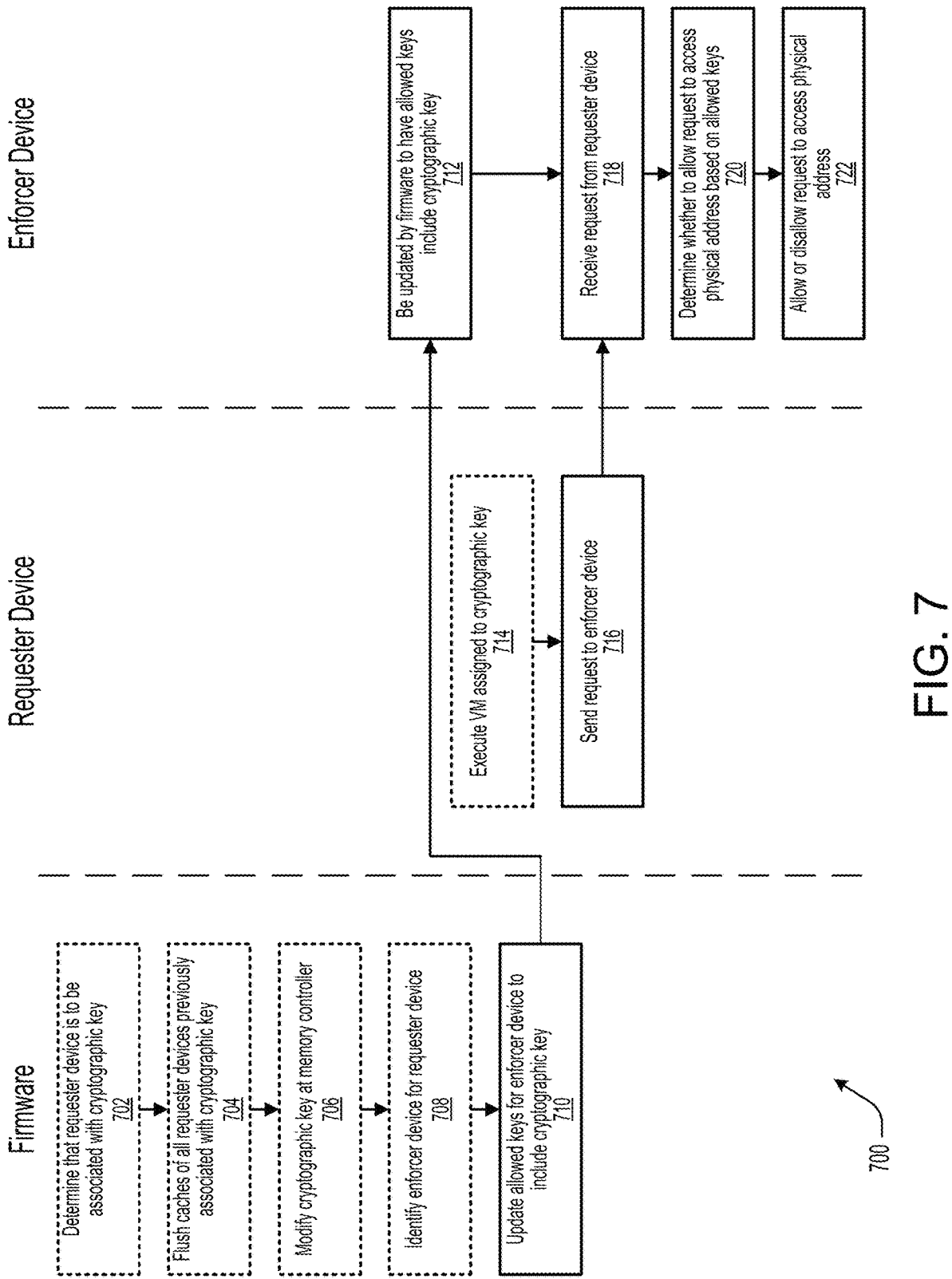
FIG. 7 illustrates an example of a method.

FIG. 7 illustrates a method 700 in accordance with some embodiments. One or more steps of method 700 may be omitted during performance of method 700, and steps of method 700 may be performed in any order and/or in parallel. One or more steps of method 700 may be performed by one or more processors. Method 700 may be implemented as a computer-readable medium or computer program product comprising instructions which, when the program is executed by one or more computers, cause the one or more computers to carry out the steps of method 700. Such computer program products can be transmitted, over a wired or wireless network, in a data carrier signal carrying the computer program product.

At step 702, firmware (e.g., firmware 248) determines that a requester device (e.g., requester device 366) is to be associated with a cryptographic key. In some embodiments, the requester device may be a processor (e.g., processors 224). In some embodiments, the requester device may be a processor core (e.g., processor cores 228, 328). In some embodiments, the requester device may be an I/O device (e.g., I/O devices 226, 326, or network interface 220). The requester device may be an element of a host device (e.g., host devices 102, 202) that includes a memory (e.g., memory 218) on which the firmware is stored. The host device may be a server computer.

In some embodiments, a hypervisor (e.g., hypervisors 110, 210) running on the host device may request that the requester device is to be associated with a cryptographic key. For example, the hypervisor may create a VM (e.g., VMs 112, 212) that is to be executed by the requester device. The hypervisor may further assign the cryptographic key to the VM and consequently associate the requester device with the cryptographic key. The hypervisor may then request (e.g., to the firmware) that the requester device is associated with the cryptographic key.

At step 704, the firmware flushes the caches of all requester devices that were previously associated with the cryptographic key. The firmware may, for example, first determine whether the cryptographic key was assigned to any VMs that were previously running on the host device. If any such VMs are identified, the firmware may then identify the requester devices (e.g., processors or processor cores) that were executing the identified VMs. The firmware may then cause the caches or other memory devices of the identified requester devices to be flushed (e.g., erased, deleted). In some examples, the caches may be L1 and/or L2 caches.

At step 706, the firmware modifies the cryptographic key at a memory controller (e.g., memory controllers 216, 616). In some embodiments, the firmware may only modify the cryptographic key at the memory controller when the firmware determines that the cryptographic key was assigned to any VMs that were previously running on the host device. In some embodiments, modifying the cryptographic key at the memory controller may be considered to effectively create a new cryptographic key, which may be referred to as a second cryptographic key, for example.

At step 708, the firmware identifies an enforcer device (e.g., enforcer devices 250, 350, 450) for the requester device. The enforcer device may be communicatively coupled to the requester device as well as to an interconnect (e.g., interconnects 222, 322) of the host device, and may therefore be effectively coupled between the requester device and the interconnect. The enforcer device may be configured to receive transaction requests from the requester device to access physical addresses (e.g., within physical address spaces 139, 239) in a host memory (e.g., host memories 104, 204). The host memory may be communicatively coupled to the interconnect. The host memory may be an element of the host device or may be separate from the host device. In some embodiments, the enforcer device may be coupled between the requester device and the host memory in any configuration such that the enforcer device may receive transaction requests from the requester device prior to the transaction requests reaching the host memory. In some embodiments, if the VM is also to be executed by a second requester device, the firmware may identify a second enforcer device for the second requester device.

At step 710, the firmware updates a set of allowed keys (e.g., allowed keys 352, 452) stored in the requester device to include the cryptographic key. In some examples, the set of allowed keys is updated to include an identifier for the cryptographic key. The identifier for the cryptographic key may include a VMID for the VM that is to be executed by the requester device. In some embodiments, when updating the set of allowed keys, the firmware may first delete any previously stored cryptographic keys in the set of allowed keys before adding any cryptographic keys. In some embodiments, each cryptographic key that is stored in the set of allowed keys may be stored in the form of a set of allowed key bits (e.g., allowed key bits 464). In some embodiments, if the VM is to be executed by the second requester device, the firmware may update a second set of allowed keys stored in the second requester device to include the cryptographic key.

At step 712 (and concurrently with step 710), at the enforcer device, the set of allowed keys stored in the enforcer device is updated by the firmware to include the cryptographic key. In some embodiments, if the VM is to be executed by the second requester device, each of steps 712 to 722 may also be performed at the second enforcer device and/or the second requester device.

At step 714, the requester device executes the VM that is assigned to the cryptographic key. In some embodiments, the requester device may execute an enclave (e.g., enclaves 134) within the VM. The enclave may be set up with the VM as its parent and may provide an environment with heightened security. In some embodiments, the enclave may be assigned to a different cryptographic key than the parent VM. In such embodiments, the requester device executing the enclave may be associated with both the cryptographic key assigned to the VM as well as the cryptographic key assigned to the enclave.

At step 716, the requester device sends a request (e.g., requests 358, 458, 558) to the enforcer device. The request may be sent based on execution of the VM at the requester device. For example, the VM may initiate the request and cause the request to be sent from the requester device. The request may be a transaction request to access a physical address in the host memory. In some embodiments, the request may be a transaction request to write data to the physical address in the host memory. In such embodiments, the request may include data to be written (e.g., write data). In some embodiments, the request may be a transaction request to read data from the physical address. In some embodiments, the request may include the physical address in the host memory and an identifier for the cryptographic key that is assigned to the VM that caused the request to be sent.

At step 718, the enforcer device receives the request from the requester device. In some instances, upon receiving the request, the enforcer device may extract the identifier for the cryptographic key from the request to obtain a set of key bits (e.g., key bits 460, 560). In some examples, the set of key bits are encoded into the physical address. For example, the set of key bits may be placed in the unused upper bits in the full address.

At step 720, the enforcer device determines whether to allow the request to access the physical address based on the set of allowed keys. For example, the enforcer device may compare the set of key bits extracted from the request to the set of allowed key bits for each stored cryptographic key in the set of allowed keys. If a matching key is found, the enforcer device may determine to allow the request to access the physical address. If no matching key is found, the enforcer device may determine to disallow the request from accessing the physical address.

At step 722, the enforcer device allows or disallows the request to access the physical address based on the determination made in step 720. For example, if the enforcer device determines to allow the request to access the physical address, the enforcer device may allow the transaction request to pass through the enforcer device without modifying the physical address. As another example, if the enforcer device determines to disallow the request from accessing the physical address, the enforcer device may modify the physical address to form a modified physical address having modified address bits (e.g., modified address bits 463) and/or modified key bits (e.g., modified key bits 461), thereby forming a modified request (e.g., modified request 459). The modified request having the modified physical address may be passed onto the interconnect where it may be redirected within host device away from the physical address (due to the modified address bits) and/or may be unable to decrypt data stored at the physical address (due to the modified key bits). In some embodiments, sending the request to the interconnect with the modified physical address may cause the host device (e.g., the firmware) to become notified that the request was disallowed access and may further identify the requester device for the host device (e.g., the firmware), allowing the host device to disable the requester device and/or the VM running on the requester device.

Figure 8:
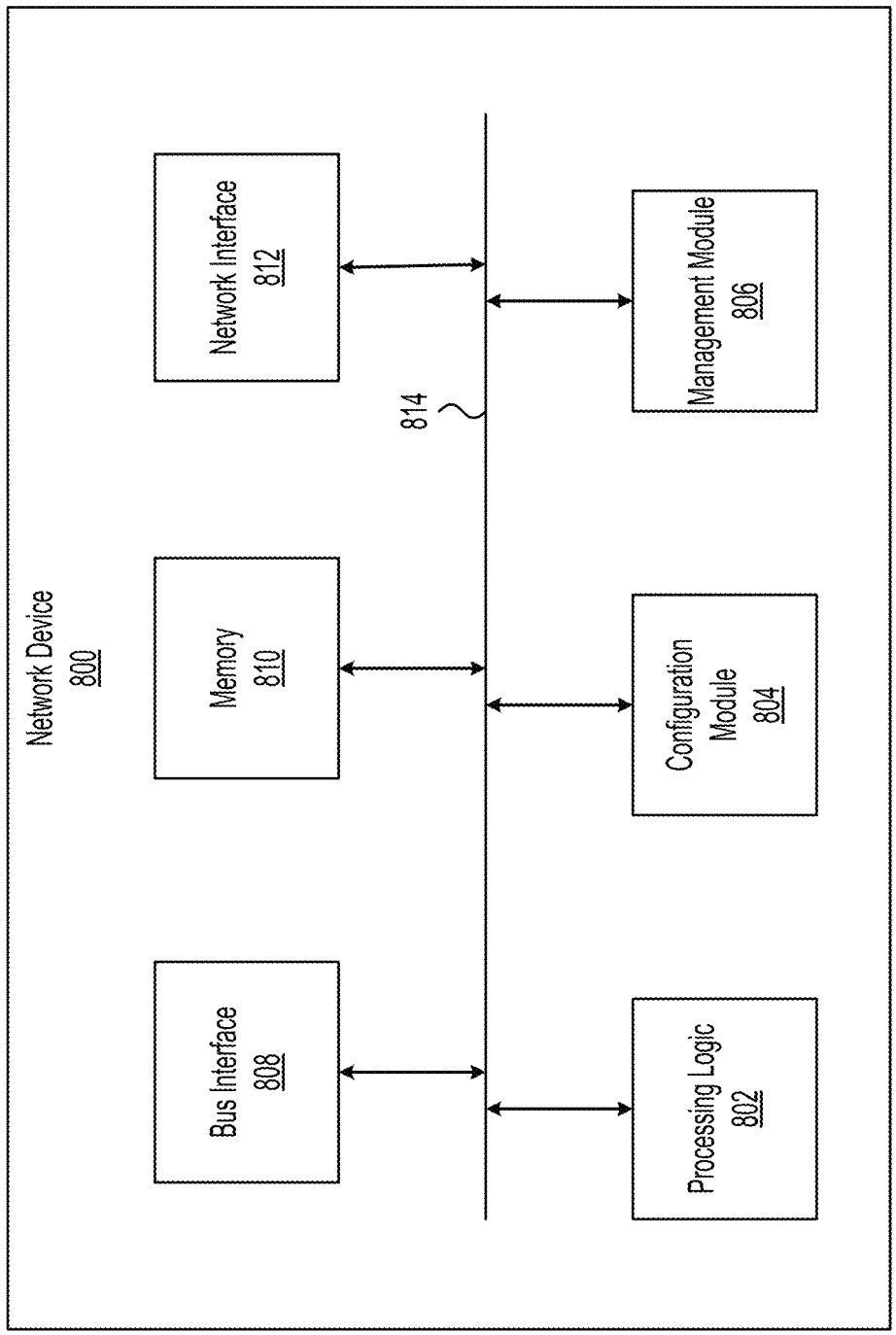
FIG. 8 illustrates an example of a network device.

FIG. 8 illustrates an example of a network device 800. Functionality and/or several components of network device 800 may be used without limitation with other embodiments disclosed elsewhere in this disclosure, without limitations. A network device 800 may facilitate processing of packets and/or forwarding of packets from network device 800 to another device. As referred to herein, a "packet" or "network packet" may refer to a variable or fixed unit of data. In some instances, a packet may include a packet header and a packet payload. The packet header may include information associated with the packet, such as the source, destination, quality of service parameters, length, protocol, routing labels, error correction information, etc. In certain implementations, one packet header may indicate information associated with a series of packets, such as a burst transaction. In some implementations, network device 800 may be the recipient and/or generator of packets. In some implementations, network device 800 may modify the contents of the packet before forwarding the packet to another device. Network device 800 may be a peripheral device coupled to another computer device, a switch, a router or any other suitable device enabled for receiving and forwarding packets.

In one example, network device 800 may include processing logic 802, a configuration module 804, a management module 806, a bus interface module 808, memory 810, and a network interface module 812. These modules may be hardware modules, software modules, or a combination of hardware and software. In certain instances, modules may be interchangeably used with components or engines, without deviating from the scope of the disclosure. Network device 800 may include additional modules, not illustrated here, such as components discussed with respect to the nodes disclosed in FIG. 9. In some implementations, network device 800 may include fewer modules. In some implementations, one or more of the modules may be combined into one module. One or more of the modules may be in communication with each other over a communication channel 814, which may include one or more busses, meshes, matrices, fabrics, a combination of these communication channels, or some other suitable communication channel.

Processing logic 802 may include application specific integrated circuits (ASICs), field programmable gate arrays (FPGAs), systems-on-chip (SoCs), network processing units (NPUs), processors configured to execute instructions or any other circuitry configured to perform logical arithmetic and floating point operations. Examples of processors that may be included in processing logic 802 may include processors developed by ARM®, MIPS®, AMD®, Intel®, Qualcomm®, and the like. In certain implementations, processors may include multiple processing cores, wherein each processing core may be configured to execute instructions independently of the other processing cores. Furthermore, in certain implementations, each processor or processing core may implement multiple processing threads executing instructions on the same processor or processing core, while maintaining logical separation between the multiple processing threads. Such processing threads executing on the processor or processing core may be exposed to software as separate logical processors or processing cores. In some implementations, multiple processors, processing cores or processing threads executing on the same core may share certain resources, such as for example busses, level 1 (L1) caches, and/or level 2 (L2) caches. The instructions executed by processing logic 802 may be stored on a computer-readable storage medium, for example, in the form of a computer program. The computer-readable storage medium may be non-transitory. In some cases, the computer-readable medium may be part of memory 810.

Memory 810 may include either volatile or non-volatile, or both volatile and non-volatile types of memory. Memory 810 may, for example, include random access memory (RAM), read only memory (ROM), Electrically Erasable Programmable Read-Only Memory (EEPROM), flash memory, and/or some other suitable storage media. In some cases, some or all of memory 810 may be internal to network device 800, while in other cases some or all of the memory may be external to network device 800. Memory 810 may store an operating system comprising executable instructions that, when executed by processing logic 802, provides the execution environment for executing instructions providing networking functionality for network device 800. The memory may also store and maintain several data structures and routing tables for facilitating the functionality of network device 800.

In some implementations, configuration module 804 may include one or more configuration registers. Configuration registers may control the operations of network device 800. In some implementations, one or more bits in the configuration register can represent certain capabilities of network device 800. Configuration registers may be programmed by instructions executing in processing logic 802, and/or by an external entity, such as a host device, an operating system executing on a host device, and/or a remote device. Configuration module 804 may further include hardware and/or software that control the operations of network device 800.

In some implementations, management module 806 may be configured to manage different components of network device 800. In some cases, management module 806 may configure one or more bits in one or more configuration registers at power up, to enable or disable certain capabilities of network device 800. In certain implementations, management module 806 may use processing resources from processing logic 802. In other implementations, management module 806 may have processing logic similar to processing logic 802, but segmented away or implemented on a different power plane than processing logic 802.

Bus interface module 808 may enable communication with external entities, such as a host device and/or other components in a computing system, over an external communication medium. Bus interface module 808 may include a physical interface for connecting to a cable, socket, port, or other connection to the external communication medium. Bus interface module 808 may further include hardware and/or software to manage incoming and outgoing transactions. Bus interface module 808 may implement a local bus protocol, such as Peripheral Component Interconnect (PCI) based protocols, Non-Volatile Memory Express (NVMe), Advanced Host Controller Interface (AHCI), Small Computer System Interface (SCSI), Serial Attached SCSI (SAS), Serial AT Attachment (SATA), Parallel ATA (PATA), some other standard bus protocol, or a proprietary bus protocol. Bus interface module 808 may include the physical layer for any of these bus protocols, including a connector, power management, and error handling, among other things. In some implementations, network device 800 may include multiple bus interface modules for communicating with multiple external entities. These multiple bus interface modules may implement the same local bus protocol, different local bus protocols, or a combination of the same and different bus protocols.

Network interface module 812 may include hardware and/or software for communicating with a network. This network interface module 812 may, for example, include physical connectors or physical ports for wired connection to a network, and/or antennas for wireless communication to a network. Network interface module 812 may further include hardware and/or software configured to implement a network protocol stack. Network interface module 812 may communicate with the network using a network protocol, such as for example TCP/IP, Infiniband, RoCE, Institute of Electrical and Electronics Engineers (IEEE) 802.11 wireless protocols, User Datagram Protocol (UDP), Asynchronous Transfer Mode (ATM), token ring, frame relay, High Level Data Link Control (HDLC), Fiber Distributed Data Interface (FDDI), and/or Point-to-Point Protocol (PPP), among others. In some implementations, network device 800 may include multiple network interface modules, each configured to communicate with a different network. For example, in these implementations, network device 800 may include a network interface module for communicating with a wired Ethernet network, a wireless 802.11 network, a cellular network, an Infiniband network, etc.

The various components and modules of network device 800, described above, may be implemented as discrete components, as a System on a Chip (SoC), as an ASIC, as an NPU, as an FPGA, or any combination thereof. In some embodiments, the SoC or other component may be communicatively coupled to another computing system to provide various services such as traffic monitoring, traffic shaping, computing, etc. In some embodiments of the technology, the SoC or other component may include multiple subsystems as disclosed with respect to FIG. 9.

Figure 9:
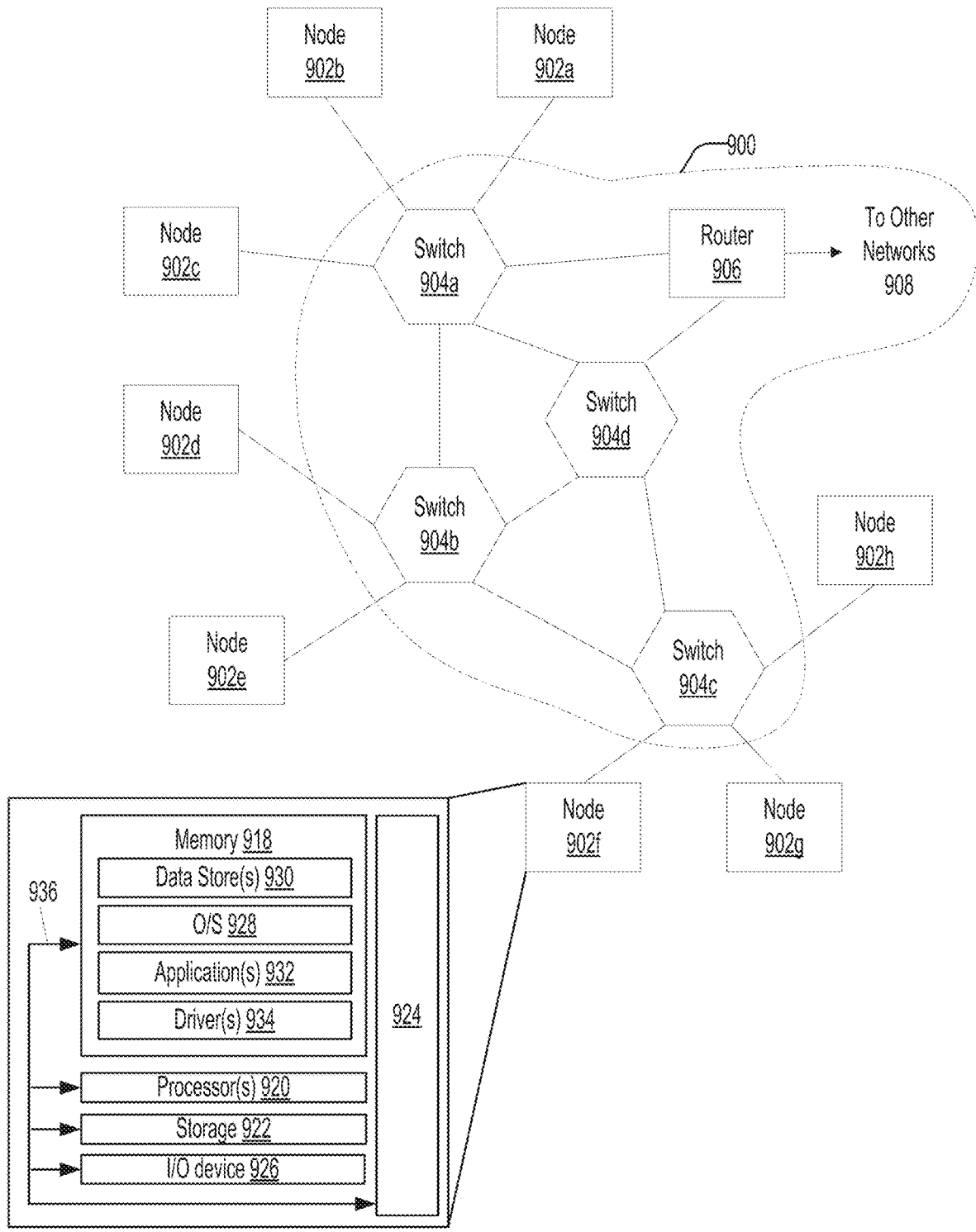
FIG. 9 illustrates an example architecture that includes one or more service provider computers and/or a user device connected via one or more networks.

FIG. 9 illustrates a network 900, illustrating various different types of network devices 800 of FIG. 8, such as nodes comprising the network device, switches and routers. In certain embodiments, network 900 may be based on a switched architecture with point-to-point links. As illustrated in FIG. 9, network 900 includes a plurality of switches 904a-904d, which may be arranged in a network. In some cases, the switches are arranged in a multi-layered network, such as a Clos network. A network device 800 that filters and forwards packets between local area network (LAN) segments may be referred to as a switch. Switches generally operate at the data link layer (layer 2) and sometimes the network layer (layer 3) of the Open System Interconnect (OSI) Reference Model and may support several packet protocols. Switches 904a-904d may be connected to a plurality of nodes 902a-902h and provide multiple paths between any two nodes.

Network 900 may also include one or more network devices 800 for connection with other networks 908, such as other subnets, LANs, wide area networks (WANs), or the Internet, and may be referred to as routers 906. Routers use headers and forwarding tables to determine the best path for forwarding the packets, and use protocols such as internet control message protocol (ICMP) to communicate with each other and configure the best route between any two devices.

In some examples, network(s) 900 may include any one or a combination of many different types of networks, such as cable networks, the Internet, wireless networks, cellular networks and other private and/or public networks. Interconnected switches 904a-904d and router 906, if present, may be referred to as a switch fabric, a fabric, a network fabric, or simply a network. In the context of a computer network, terms "fabric" and "network" may be used interchangeably herein.

Nodes 902a-902h may be any combination of host systems, processor nodes, storage subsystems, and I/O chassis that represent user devices, service provider computers or third party computers.

User devices may include computing devices to access an application 932 (e.g., a web browser or mobile device application). In some aspects, application 932 may be hosted, managed, and/or provided by a computing resources service or service provider. Application 932 may allow the user(s) to interact with the service provider computer(s) to, for example, access web content (e.g., web pages, music, video, etc.). The user device(s) may be a computing device such as for example a mobile phone, a smart phone, a personal digital assistant (PDA), a laptop computer, a netbook computer, a desktop computer, a thin-client device, a tablet computer, an electronic book (e-book) reader, a gaming console, etc. In some examples, the user device(s) may be in communication with the service provider computer(s) via other network(s) 908. Additionally, the user device(s) may be part of the distributed system managed by, controlled by, or otherwise part of the service provider computer(s) (e.g., a console device integrated with the service provider computers).

The node(s) of FIG. 9 may also represent one or more service provider computers. One or more service provider computers may provide a native application that is configured to run on the user devices, which user(s) may interact with. The service provider computer(s) may, in some examples, provide computing resources such as, but not limited to, client entities, low latency data storage, durable data storage, data access, management, virtualization, cloud-based software solutions, electronic content performance management, and so on. The service provider computer(s) may also be operable to provide web hosting, databasing, computer application development and/or implementation platforms, combinations of the foregoing or the like to the user(s). In some embodiments, the service provider computer(s) may be provided as one or more virtual machines implemented in a hosted computing environment. The hosted computing environment may include one or more rapidly provisioned and released computing resources. These computing resources may include computing, networking and/or storage devices. A hosted computing environment may also be referred to as a cloud computing environment. The service provider computer(s) may include one or more servers, perhaps arranged in a cluster, as a server farm, or as individual servers not associated with one another and may host application 932 and/or cloud-based software services. These servers may be configured as part of an integrated, distributed computing environment. In some aspects, the service provider computer(s) may, additionally or alternatively, include computing devices such as for example a mobile phone, a smart phone, a personal digital assistant (PDA), a laptop computer, a desktop computer, a netbook computer, a server computer, a thin-client device, a tablet computer, a gaming console, etc. In some instances, the service provider computer(s), may communicate with one or more third party computers.

In one example configuration, node(s) 902a-902h may include at least one memory 918 and one or more processing units (or processor(s) 920). Processor(s) 920 may be implemented in hardware, computer-executable instructions, firmware, or combinations thereof. Computer-executable instruction or firmware implementations of processor(s) 920 may include computer-executable or machine-executable instructions written in any suitable programming language to perform the various functions described.

In some instances, processor(s) 920 may be a single core processor or a multi-core processor. A multi-core processor may include multiple processing units within the same processor. In some embodiments, the multi-core processors may share certain resources, such as buses and second or third level caches. In some instances, each core in a single or multi-core processor may also include multiple executing logical processors (or executing threads). In such a core (e.g., those with multiple logical processors), several stages of the execution pipeline and also lower level caches may also be shared.

Memory 918 may store program instructions that are loadable and executable on processor(s) 920, as well as data generated during the execution of these programs. Depending on the configuration and type of node(s) 902a-902h, memory 918 may be volatile (such as RAM) and/or non-volatile (such as ROM, flash memory, etc.). Memory 918 may include an operating system 928, one or more data stores 930, one or more application programs 932, one or more drivers 934, and/or services for implementing the features disclosed herein.

Operating system 928 may support nodes 902a-902h basic functions, such as scheduling tasks, executing applications, and/or controller peripheral devices. In some implementations, a service provider computer may host one or more virtual machines. In these implementations, each virtual machine may be configured to execute its own operating system. Examples of operating systems include Unix, Linux, Windows, Mac OS, iOS, Android, and the like. Operating system 928 may also be a proprietary operating system.

Data stores 930 may include permanent or transitory data used and/or operated on by operating system 928, application programs 932, or drivers 934. Examples of such data include web pages, video data, audio data, images, user data, and so on. The information in data stores 930 may, in some implementations, be provided over network(s) 908 to user devices 904. In some cases, data stores 930 may additionally or alternatively include stored application programs and/or drivers. Alternatively or additionally, data stores 930 may store standard and/or proprietary software libraries, and/or standard and/or proprietary application user interface (API) libraries. Information stored in data stores 930 may be machine-readable object code, source code, interpreted code, or intermediate code.

Drivers 934 include programs that may provide communication between components in a node. For example, some drivers 934 may provide communication between the operating system 928 and additional storage 922, network device 924, and/or I/O device 926. Alternatively or additionally, some drivers 934 may provide communication between application programs 932 and operating system 928, and/or application programs 932 and peripheral devices accessible to the service provider computer. In many cases, drivers 934 may include drivers that provide well-understood functionality (e.g., printer drivers, display drivers, hard disk drivers, Solid State Device drivers). In other cases, drivers 934 may provide proprietary or specialized functionality.

The service provider computer(s) or servers may also include additional storage 922, which may include removable storage and/or non-removable storage. Additional storage 922 may include magnetic storage, optical disks, solid state disks, flash memory, and/or tape storage. Additional storage 922 may be housed in the same chassis as node(s) 902a-902h or may be in an external enclosure. Memory 918 and/or additional storage 922 and their associated computer-readable media may provide non-volatile storage of computer-readable instructions, data structures, program modules, and other data for the computing devices. In some implementations, memory 918 may include multiple different types of memory, such as SRAM, DRAM, or ROM.

Memory 918 and additional storage 922, both removable and non-removable, are examples of computer-readable storage media. For example, computer-readable storage media may include volatile or non-volatile, removable or non-removable media implemented in a method or technology for storage of information, the information including, for example, computer-readable instructions, data structures, program modules, or other data. Memory 918 and additional storage 922 are examples of computer storage media. Additional types of computer storage media that may be present in node(s) 902a-902h may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, solid state drives, or some other medium which can be used to store the desired information and which can be accessed by node(s) 902a-902h. Computer-readable media also includes combinations of any of the above media types, including multiple units of one media type.

Alternatively or additionally, computer-readable communication media may include computer-readable instructions, program modules or other data transmitted within a data signal, such as a carrier wave or other transmission. However, as used herein, computer-readable storage media does not include computer-readable communication media.

Node(s) 902a-902h may also include I/O device(s) 926, such as a keyboard, a mouse, a pen, a voice input device, a touch input device, a display, speakers, a printer, and the like. Node(s) 902a-902h may also include one or more communication channels 936. A communication channel 936 may provide a medium over which the various components of the node(s) 902a-902h can communicate. The communication channel or channels 936 may take the form of a bus, a ring, a switching fabric, or a network.

Node(s) 902a-902h may also contain network device(s) 924 that allow node(s) 902a-902h to communicate with a stored database, another computing device or server, user terminals and/or other devices on network(s) 900. Network device(s) 924 of FIG. 9 may include similar components discussed with reference to network device 800 of FIG. 8.

In some implementations, network device 924 is a peripheral device, such as a PCI-based device. In these implementations, network device 924 includes a PCI interface for communicating with a host device. The term "PCI" or "PCI-based" may be used to describe any protocol in the PCI family of bus protocols, including the original PCI standard, PCI-X, Accelerated Graphics Port (AGP), and PCI-Express (PCIe) or any other improvement or derived protocols that are based on the PCI protocols discussed herein. The PCI-based protocols are standard bus protocols for connecting devices, such as a local peripheral device to a host device. A standard bus protocol is a data transfer protocol for which a specification has been defined and adopted by various manufacturers. Manufacturers ensure that compliant devices are compatible with computing systems implementing the bus protocol, and vice versa. As used herein, PCI-based devices also include devices that communicate using Non-Volatile Memory Express (NVMe). NVMe is a device interface specification for accessing non-volatile storage media attached to a computing system using PCIe. For example, bus interface module 808 may implement NVMe, and network device 924 may be connected to a computing system using a PCIe interface.

A PCI-based device may include one or more functions. A "function" describes operations that may be provided by network device 924. Examples of functions include mass storage controllers, network controllers, display controllers, memory controllers, serial bus controllers, wireless controllers, and encryption and decryption controllers, among others. In some cases, a PCI-based device may include more than one function. For example, a PCI-based device may provide a mass storage controller and a network adapter. As another example, a PCI-based device may provide two storage controllers, to control two different storage resources. In some implementations, a PCI-based device may have up to eight functions.

In some implementations, network device 924 may include single-root I/O virtualization (SR-IOV). SR-IOV is an extended capability that may be included in a PCI-based device. SR-IOV allows a physical resource (e.g., a single network interface controller) to appear as multiple resources (e.g., sixty-four network interface controllers). Thus, a PCI-based device providing a certain functionality (e.g., a network interface controller) may appear to a device making use of the PCI-based device to be multiple devices providing the same functionality. The functions of an SR-IOV-capable storage adapter device may be classified as physical functions (PFs) or virtual functions (VFs). Physical functions are fully featured functions of the device that can be discovered, managed, and manipulated. Physical functions have configuration resources that can be used to configure or control the storage adapter device. Physical functions include the same configuration address space and memory address space that a non-virtualized device would have. A physical function may have a number of virtual functions associated with it. Virtual functions are similar to physical functions, but are light-weight functions that may generally lack configuration resources, and are generally controlled by the configuration of their underlying physical functions. Each of the physical functions and/or virtual functions may be assigned to a respective thread of execution (such as for example, a virtual machine) running on a host device.

The modules described herein may be software modules, hardware modules or a suitable combination thereof. If the modules are software modules, the modules can be embodied on a non-transitory computer readable medium and processed by a processor in any of the computer systems described herein. It should be noted that the described processes and architectures can be performed either in real-time or in an asynchronous mode prior to any user interaction. The modules may be configured in the manner suggested in FIG. 8, FIG. 9, and/or functions described herein can be provided by one or more modules that exist as separate modules and/or module functions described herein can be spread over multiple modules.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Various embodiments of this disclosure are described herein, including the best mode known to the inventors for carrying out the disclosure. Variations of those embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A host server computer comprising:
    an interconnect;
    a host memory coupled to the interconnect;
    a set of processor cores including a first processor core and a second processor core, the set of processor cores configured to execute instructions stored in the host memory, wherein execution of the instructions causes the set of processor cores to:
        execute a first virtual machine (VM) using the first processor core and a second VM using the second processor core, wherein the first VM is assigned to a first cryptographic key, and wherein the second VM is assigned to a second cryptographic key; and
        send a first request from the first processor core toward the interconnect for the first VM and a second request from the second processor core toward the interconnect for the second VM, wherein the first request includes a first physical address in the host memory and the second request includes a second physical address in the host memory; and
    a set of enforcer devices coupled between the set of processor cores and the interconnect, the set of enforcer devices including a first enforcer device for the first processor core and a second enforcer device for the second processor core, wherein the first enforcer device is configured to receive the first request and determine whether to allow the first request to access the first physical address via the interconnect based on a first set of allowed keys, and wherein the second enforcer device is configured to receive the second request and determine whether to allow the second request to access the second physical address via the interconnect based on a second set of allowed keys.

2. The host server computer of claim 1, wherein the host server computer is configured to execute firmware stored on the host server computer that:
    determines that the first processor core is associated with the first cryptographic key and the second processor core is associated with the second cryptographic key; and updates the first set of allowed keys to include an identifier for the first cryptographic key and the second set of allowed keys to include an identifier for the second cryptographic key.

3. The host server computer of claim 2, wherein the firmware, when executed by the host server computer, further:
   determines that a third processor core of the set of processor cores, in addition to the first processor core, is to execute the first VM; and
   updates a third set of allowed keys of a third enforcer device to include the identifier for the first cryptographic key, wherein the third enforcer device is configured to determine whether to allow requests from the third processor core to access physical addresses in the host memory via the interconnect based on the third set of allowed keys.

4. The host server computer of claim 2, wherein the firmware, when executed by the host server computer, further:
   prior to updating the first set of allowed keys, flushes each cache of each processor core that was previously associated with the first cryptographic key.

5. The host server computer of claim 2, wherein the firmware, when executed by the host server computer, further:
   determines that the first processor core is to execute a third VM, wherein the third VM is assigned to a third cryptographic key; and
   updates the first set of allowed keys to include both the identifier for the first cryptographic key and an identifier for the third cryptographic key.

6. An integrated circuit device comprising:
   a storage element configured to store a set of allowed keys; and
   a key extractor configured to extract key bits from requests received from a requester device;
   wherein the integrated circuit device is configured to:
      be updated to have the set of allowed keys include an identifier for a first cryptographic key and an identifier for a second cryptographic key, wherein the first cryptographic key is assigned to a first virtual machine (VM) and the second cryptographic key is assigned to a second VM;
      receive a request from the requester device to access a physical address in a host memory coupled to an interconnect;
      extract a set of key bits from the request using the key extractor; and
      determine whether to allow the request to access the physical address via the interconnect based on the set of allowed keys and the set of key bits.

7. The integrated circuit device of claim 6, wherein determining whether to allow the request to access the physical address includes:
   comparing the set of key bits to the set of allowed keys.

8. The integrated circuit device of claim 6, wherein the set of key bits are encoded into the physical address of the request.

9. The integrated circuit device of claim 6, wherein the integrated circuit device is further configured to:
   in response to determining that the request is not allowed to access the physical address, modify the physical address in the request into a modified physical address to prevent the request from accessing the physical address; and
   send the request having the modified physical address to the interconnect with the modified physical address.

10. The integrated circuit device of claim 9, wherein sending the request having the modified physical address to the interconnect with the modified physical address causes a host device to become notified that the request is not allowed to access the physical address.

11. The integrated circuit device of claim 6, wherein the requester device is a processor core of a set of processor cores of a host device.

12. The integrated circuit device of claim 11, wherein the processor core is configured to execute the first VM and the second VM.

13. The integrated circuit device of claim 6, wherein the requester device is an input/output (IO) device.

14. A non-transitory computer-readable medium comprising instructions that, when executed by a processor, cause the processor to perform operations comprising:
   determining that a requester device is associated with a first cryptographic key;
   identifying an enforcer device for the requester device that is coupled to an interconnect, the enforcer device configured to receive requests from the requester device to access physical addresses in a host memory coupled to the interconnect, wherein the enforcer device is configured to determine whether to allow a request to access a physical address via the interconnect based on a set of allowed keys stored in the enforcer device; and
   updating the set of allowed keys to include an identifier for the first cryptographic key and an identifier for a second cryptographic key, wherein the first cryptographic key is assigned to a first virtual machine (VM) and the second cryptographic key is assigned to a second VM.

15. The non-transitory computer-readable medium of claim 14, wherein the requester device is a processor core of a set of processor cores.

16. The non-transitory computer-readable medium of claim 15, wherein the processor core is configured to execute the first VM and the second VM.

17. The non-transitory computer-readable medium of claim 16, wherein the operations further comprise:
   determining that a second processor core of the set of processor cores, in addition to the processor core, is to execute the first VM, wherein the processor core is a first processor core; and
   updating a second set of allowed keys of a second enforcer device to include the identifier for the first cryptographic key.

18. The non-transitory computer-readable medium of claim 14, wherein the instructions correspond to firmware for a host device.

* * * * *